US006892745B2

(12) United States Patent
Benson (10) Patent No.: US 6,892,745 B2
(45) Date of Patent: May 17, 2005

(54) FLOW CONTROL VALVE WITH INTEGRAL SENSOR AND CONTROLLER AND RELATED METHOD

(75) Inventor: Dwayne M. Benson, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 540 days.

(21) Appl. No.: 10/119,686

(22) Filed: Apr. 10, 2002

(65) Prior Publication Data

US 2003/0192595 A1 Oct. 16, 2003

(51) Int. Cl.[7] .................................................. G05D 7/01
(52) U.S. Cl. ........................... 137/1; 137/488; 137/489
(58) Field of Search ............................... 137/14, 488, 1, 137/489

(56) References Cited

U.S. PATENT DOCUMENTS

| 3,695,105 A | 10/1972 | Carlson |
| 4,428,194 A | 1/1984 | Stokes et al. |
| 4,445,532 A | 5/1984 | Mitchell |
| 4,458,718 A | 7/1984 | Vick |

(Continued)

FOREIGN PATENT DOCUMENTS

| DE | 100 01 165 | 7/2001 |
| JP | 62270873 | 11/1987 |

*Primary Examiner*—Kevin Lee
(74) *Attorney, Agent, or Firm*—Douglas A. Mullen, Esq.

(57) ABSTRACT

A flow control valve assembly, and a method of determining and controlling fluid flow through the valve, that is relatively simple in design, is relatively inexpensive, is accurate, and has a relatively wide measurement range. The flow control valve is relatively compact and includes all of the flow measurement and control components in a single, relatively compact assembly. Such components may include a differential pressure sensor, pressure sensor, a temperature sensor, a position sensor, and a processor. The differential pressure sensor senses differential pressure across the variable area flow orifice. The pressure sensor senses fluid pressure within the valve and supplies a fluid pressure signal. The temperature sensor senses fluid temperature and supplies a fluid temperature signal. The position sensor senses the position of the variable area flow orifice and supplies a position signal. The processor receives the differential pressure signal, the fluid pressure signal, the fluid temperature signal, and the position signal and uses these signals to determine and control fluid flow parameter in the passageway.

32 Claims, 5 Drawing Sheets

U.S. PATENT DOCUMENTS

| | | |
|---|---|---|
| 4,520,844 A | 6/1985 | Finkelstein et al. |
| 4,553,474 A | 11/1985 | Wong et al. |
| 4,768,555 A | 9/1988 | Abel |
| 4,796,651 A | 1/1989 | Ginn et al. |
| 4,964,422 A | 10/1990 | Ball et al. |
| 4,964,431 A | 10/1990 | Ball et al. |
| 4,967,778 A | 11/1990 | Ball et al. |
| 5,000,213 A | 3/1991 | Tervo et al. |
| 5,005,804 A | 4/1991 | Andersen et al. |
| 5,029,599 A | 7/1991 | Ball |
| 5,067,506 A | 11/1991 | Ball et al. |
| 5,090,390 A | 2/1992 | Feldinger |
| 5,102,097 A | 4/1992 | Davis et al. |
| 5,113,910 A | 5/1992 | Ball |
| 5,152,309 A | 10/1992 | Twerdochlib et al. |
| 5,190,068 A | 3/1993 | Philbin |
| 5,334,090 A | 8/1994 | Rix |
| 5,348,036 A * | 9/1994 | Oksanen et al. ............ 137/488 |
| 5,351,934 A | 10/1994 | Jensen et al. |
| 5,365,795 A | 11/1994 | Brower, Jr. |
| 5,379,792 A | 1/1995 | Van Becelaere |
| 5,386,848 A | 2/1995 | Gilchrist et al. |
| 5,460,149 A * | 10/1995 | Tofel et al. ................. 123/676 |
| 5,469,749 A | 11/1995 | Shimada et al. |
| 5,472,014 A | 12/1995 | Carlson |
| 5,520,578 A | 5/1996 | Bloch et al. |
| 5,590,852 A | 1/1997 | Olson |
| 5,873,351 A | 2/1999 | Vars et al. |
| 5,927,335 A | 7/1999 | Christensen |
| 5,996,464 A | 12/1999 | McLevige et al. |
| 6,006,780 A | 12/1999 | Tseng et al. |
| 6,016,832 A | 1/2000 | Vars et al. |
| 6,227,247 B1 | 5/2001 | Abel |
| 6,233,919 B1 | 5/2001 | Abel et al. |
| 6,276,125 B1 | 8/2001 | Tseng |

* cited by examiner

FLOW CONTROL VALVE WITH INTEGRAL SENSOR AND CONTROLLER AND RELATED METHOD

BACKGROUND OF THE INVENTION

The present invention relates to an apparatus and method for measuring and controlling fluid flow in a valve or passageway and, more particularly, to an apparatus and method for measuring and controlling fluid flow through a variable area flow orifice within the valve or duct.

Systems and methods for measuring and controlling fluid flow in a system are found in various industries. For example, various air distribution systems in commercial aircraft use various devices for measuring and controlling the flow of air through numerous branch lines that feed different portions of the aircraft. The flow of air through these branch lines may be controlled by a control valve, in response to a flow rate measurement.

The control valves presently known may be either mechanically complex or simple. One mechanically complex control valve may have a relatively heavy, complex, and expensive all mechanical servo valve that both measures and controls fluid flow rate. One mechanically simple control valve may have a simple, mechanical valve that is remotely actuated by a controller that uses either a venturi type flow sensor or a hot wire anemometer type flow sensor.

Although the above control valve schemes are generally acceptable, each has certain drawbacks. For example, the mechanically complex valve may have limited dynamic range and may be limited to one or two flow rate set points. The valve with a venturi type sensor may have limited dynamic range and may be relatively expensive. A hot wire anemometer may also be relatively expensive, may have poor accuracy, and may be limited to low temperature applications.

Hence, there is a need for an improved apparatus and method of controlling fluid flow through one or more branch lines of a system that addresses one or more of the above-noted drawbacks. Namely, an apparatus and method that is mechanically simple and/or relatively inexpensive, yet uses a flow measurement and control scheme that is accurate and/or is not unduly limited in its measurement range. The present invention addresses one or more of these needs.

SUMMARY OF THE INVENTION

The present invention provides an apparatus and method for measuring and controlling fluid flow through a variable area flow orifice that is relatively simple in design, is relatively inexpensive, is accurate, and has a wide measurement range.

In one embodiment of the present invention, and by way of example only, an apparatus for measuring and controlling fluid a flow parameter in a passageway having a variable area flow orifice includes a first pressure sensor, a second pressure sensor, a temperature sensor, a position sensor, and a processor. The first pressure sensor is coupled to the passageway and is operable to sense a first fluid pressure within the passageway and supply a first fluid pressure signal. The second pressure sensor is coupled to the passageway and is operable to sense a second fluid pressure and supply a second fluid pressure signal. The temperature sensor is coupled to the passageway and is operable to sense fluid temperature and supply an fluid temperature signal. The position sensor is coupled to the variable area flow orifice and is operable to sense a position of the variable area flow orifice and supply a position signal. The processor is coupled to receive the first fluid pressure signal, the second fluid pressure signal, the fluid temperature signal, and the position signal and is operable to determine the fluid flow parameter in the passageway therefrom.

In another exemplary embodiment of the present invention, a flow control valve for controlling the flow of a fluid in one or more parts of a system includes a valve assembly, a temperature sensor, and a housing. The valve assembly includes a passageway and a valve disk. The passageway has a flow passage extending between a fluid inlet and a fluid outlet, and the valve disk is rotationally mounted within the flow passage and is moveable through a plurality of positions each corresponding to a different flow area. The temperature sensor is coupled to the passageway and is operable to sense fluid temperature and supply an upstream fluid temperature signal. The housing assembly is coupled to the valve assembly and encloses a first pressure sensor, a second pressure sensor, a position sensor, and a processor. The first pressure sensor is coupled to the passageway and is operable to sense a first pressure within the passageway and supply a first pressure signal. The second pressure sensor is coupled to the passageway and is operable to sense fluid pressure and supply a second fluid pressure signal. The position sensor is coupled to the variable area flow orifice and is operable to sense a position of the variable area flow orifice and supply a position signal. The processor is coupled to receive the first fluid pressure signal, the second fluid pressure signal, the fluid temperature signal, and the position signal and is operable to determine a fluid flow parameter in the passageway therefrom.

In yet another exemplary embodiment of the present invention, a method of determining a fluid flow parameter in a passageway having a variable area flow orifice includes determining a differential pressure across the variable area flow orifice, determining fluid pressure in the duct, determining fluid temperature, determining a position of the variable area flow orifice, and determining fluid flow rate in the passageway based on the determined differential pressure, the determined fluid pressure, the determined fluid temperature, and the determined valve position.

Other independent features and advantages of the preferred embodiments will become apparent from the following detailed description, taken in conjunction with the accompanying drawings which illustrate, by way of example, the principles of the invention.

DETAILED DESCRIPTION OF THE PREFERRED EMBODIMENT

Before proceeding with the detailed description, it is to be appreciated that the present invention is not limited to the embodiment described herein. Thus, although the present embodiment is, for convenience of explanation, depicted and described as a flow control valve with a system that is used to determine and control mass flow rate, it will be appreciated that it can be used to determine and control other fluid flow properties, such as volumetric flow rate and heat flow rate.

Figure 1:
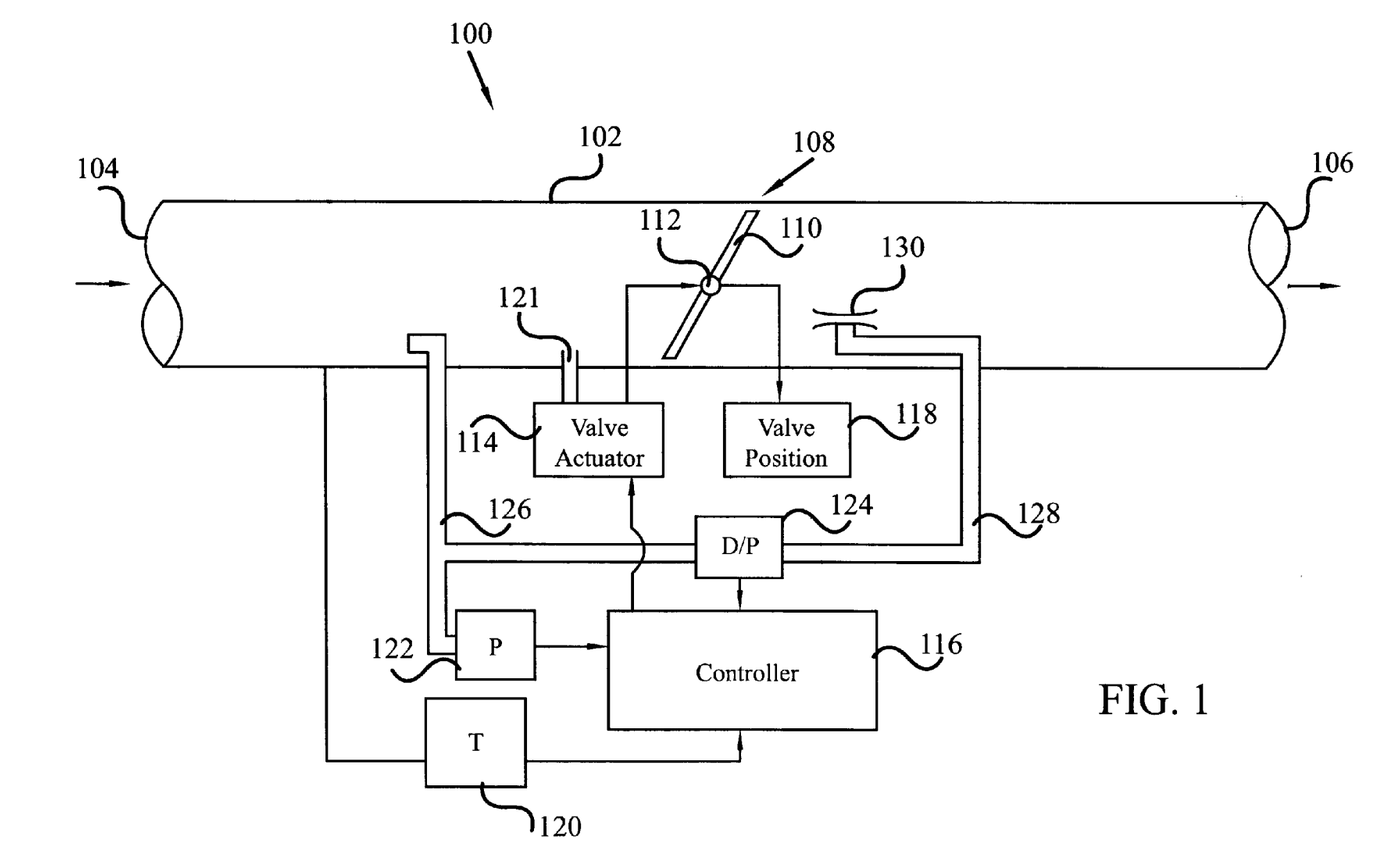
FIG. 1 is a simplified schematic representation of a flow control valve according to an embodiment of the present invention.

Turning now to the detailed description, a schematic representation of a flow control valve is depicted in FIG. 1. The flow control valve 100 includes a passageway 102 that has an inlet opening 104 and an outlet opening 106. The fluid whose flow rate is being controlled flows into the inlet 104 and exits the outlet 106. The valve can be used to measure and control the flow rate of various types of fluid, including both liquids and gasses. In a preferred embodiment, however, the fluid is a gas, such as air.

The flow rate of the fluid through the passageway 102 is controlled by a variable area flow orifice which, in the depicted embodiment is a butterfly valve gate 108. The butterfly valve gate 108 includes a valve disk 110 that is mounted on a shaft 112, which is in turn rotationally mounted within the passageway 102. The flow rate of the fluid through the passageway 102 may be varied by changing the angular position of the butterfly valve gate 108. Specifically, the butterfly valve gate 108 may be moved between a closed position where the disk 110 is oriented substantially perpendicular to the fluid flow path, thus blocking fluid flow through the passageway 102, and a fully-open position where the disk 110 is oriented substantially parallel to the fluid flow path, thus presenting less resistance to fluid flow through the passageway 102. It will be appreciated that other types of valves may be used to implement the variable area flow orifice including, but not limited to, poppet valves, ball valves, and sleeve valves.

The position of the valve gate 108 is controlled by a valve actuator assembly 114 that receives a position control signal from a controller 116, the function of which is described in more detail below. The actuator assembly 114 may be any one of numerous valve actuation devices known in the art including an electric, pneumatic, or hydraulic actuator, which may be directly coupled to the shaft 112 or coupled to the shaft via one or more gears or linkages. However, the preferred actuator assembly 114 is an electro-pneumatic type of actuator that is coupled to the passageway 102 using a supply pressure conduit 121. Specifically, as depicted schematically in FIG. 2, the actuator assembly 114 includes an actuator piston assembly 202 and a torque motor 204 coupled together by a control pressure conduit 206.

Figure 2:
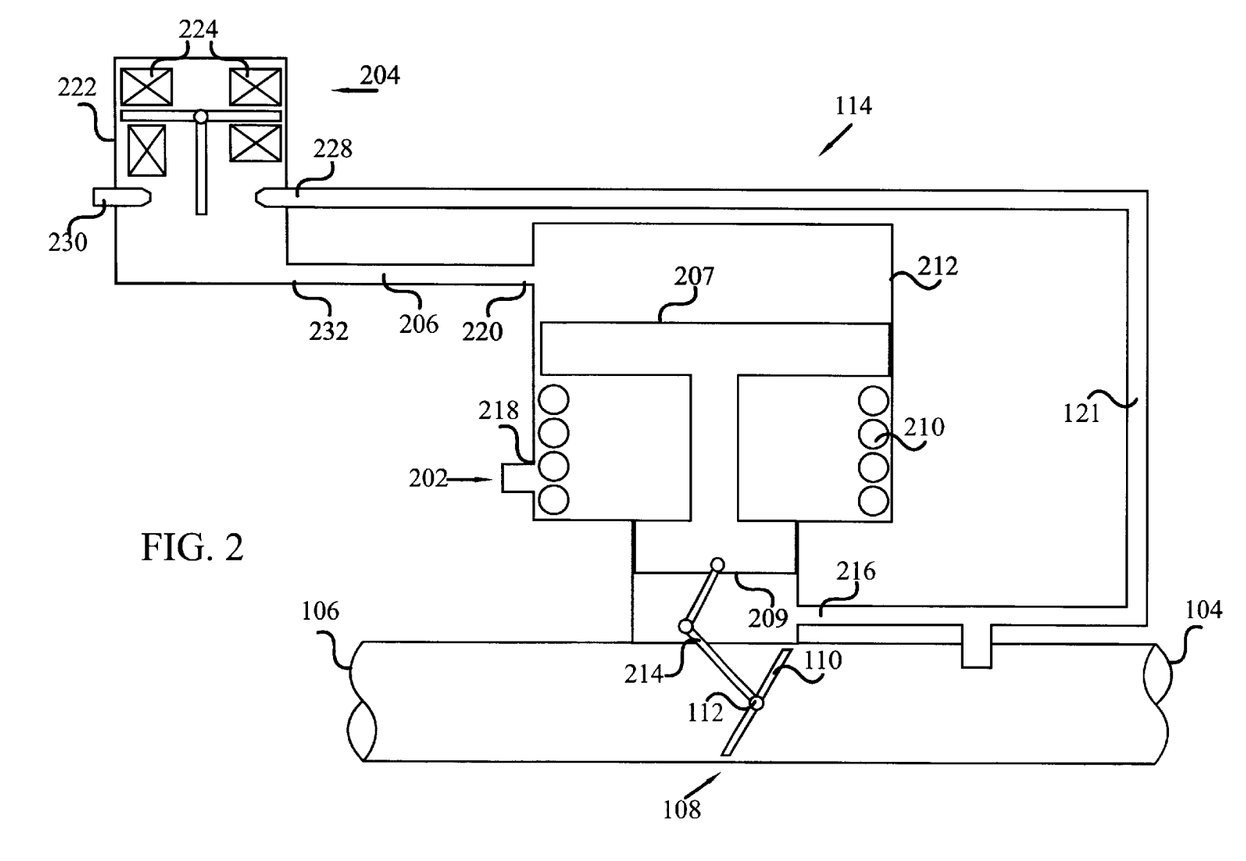
FIG. 2 is a simplified schematic representation of an actuator assembly used in the flow control valve of FIG. 1.

The preferred actuator piston assembly 202 includes a dual-faced piston 208 and a spring 210 mounted within an actuator housing 212. The piston 208 includes a first face 207 and a second face 209. As FIG. 2 depicts, the surface area of the first face 207 is larger than that of the second face 209. One or more links 214 are coupled between the second face 209 of the piston 208 and the shaft 112. These links 214, in response to movement of the piston 208, cause the shaft 112 to rotate, thereby positioning the valve disk 110. The piston housing 212 includes three ports, a first supply pressure port 216, a first ambient pressure port 218, and a first control pressure port 220. The first supply pressure port 216 is coupled to receive fluid pressure from upstream of the valve 108 and, in combination with the spring 210, biases the piston 208 upwardly, which biases the valve disk 110 to the closed position.

The first ambient pressure port 218, as its name implies, vents the portion of the piston housing 212 between the first 207 and second 209 piston faces. The first control pressure port 220 receives a control pressure from the torque motor 204, via the control pressure conduit 206. Thus, as the pressure magnitude in the control pressure line 206 increases to, and above, a magnitude sufficient to overcome the force of the spring 210 and the force from the supply pressure on the second face 209, the valve disk 110 is appropriately positioned.

The pressure magnitude in the control pressure conduit 206 is controlled by the torque motor 204. The torque motor 204 may be any one of numerous designs known in the art. In the depicted embodiment, the torque motor 204 is enclosed in a housing 222. The torque motor housing 222, like the piston housing 212, includes three ports, a second supply pressure port 228, a second ambient pressure port 230, and a second control pressure port 232. The second supply pressure port 228 is coupled to receive fluid pressure from upstream of the valve 108, and may share a common line with the piston housing supply pressure port 216. The second ambient pressure port 230 vents the torque motor housing 222 to atmosphere, and the second control pressure port supplies a control pressure to the control pressure conduit 206.

The torque motor 204, as will be discussed in more detail below, receives a control current from the controller 116 and, in response, controls the pressure magnitude supplied through the second control pressure port 232 between supply and ambient pressures. An increase in control current to the torque motor 204 will cause an increase in pressure magnitude in the control pressure conduit 206, which will cause the valve 108 to move toward the open position. Conversely, as the control current supplied to the torque motor 204 decreases, the pressure magnitude in the control pressure conduit 206 increases. This will cause the valve 108 to move toward the closed position.

Returning once again to FIG. 1, the position of the valve 108, as was noted above, is controlled by position control signals supplied to the actuator assembly 114 from the controller 116. To provide this control function, the controller 116 determines the flow rate of fluid through the passageway 102 using various sensed parameters. These parameters include valve position and various fluid parameters, such as temperature, pressure, and differential pressure, that are sensed at various points in the passageway 102. The controller 116 then compares the determined flow rate to a desired flow rate and positions the valve 108, via the actuator assembly 114, as necessary to achieve the desired flow rate. Each of these various parameters and the devices used to sense them will now be discussed in more detail.

Valve position is sensed by a valve position sensor 118, which supplies a position signal to the controller 116. The valve position sensor 118 may be any one of numerous devices known in the art for providing an indication of valve position including, but not limited to, a linear variable differential transformer (LVDT), a rotational variable differential transformer (RVDT), a potentiometer, or a piezoelectric sensor. In the preferred embodiment the valve position sensor 118 is an RVDT.

A temperature sensor 120 senses fluid temperature. This temperature may be physically sensed either upstream of the valve 108 or downstream of the valvee 108. Preferably, the fluid temperature is sensed upstream of the valve 108; however, since the preferred method by which pressure is determined and controlled (discussed further below) is a function of the square root of the fluid temperature, sensing it downstream of the valve provides sufficient accuracy. The temperature 120 sensor may be any one of numerous temperature sensing devices known in the art including, but not limited to, a resistance temperature detector (RTD), a thermocouple, and an optical temperature sensor. In the preferred embodiment, however, the temperature sensor is an RTD. A pressure sensor 122 is coupled to the passageway 102 and senses fluid pressure within the passageway 102. The pressure sensor 122 may be coupled to the passageway 102 to sense pressure either upstream or downstream of the valve 108; however, in a preferred embodiment, the pressure sensor 122 is coupled to the passageway 102 to sense pressure upstream of the valve 108. It will be appreciated that the pressure sensor 120 may be configured to measure either total pressure or static pressure, and may be any one of numerous pressure sensing devices known in the art including, but not limited to, a capacitance sensor, a strain gauge sensor, and a thermal sensor. However, in the preferred embodiment the pressure sensor 120 is a piezoresistive sensor. A differential pressure sensor 124 is also coupled to the passageway 102 and is configured to sense the differential pressure across the valve 108. The differential pressure sensor 124, as with the pressure sensor 122, may be any one of numerous devices known in the art for sensing differential pressure, and may also be comprised of a single sensor or dual pressure sensors. However, in the preferred embodiment the differential pressure sensor 124 is a single piezoresistive sensor. It is noted that if the differential pressure sensor 124 is comprised of dual pressure sensors, one of the two pressure sensors could be pressure sensor 122. In this latter case, the skilled artisan will appreciate that the controller 116 would determine the differential pressure across the valve 108 based on the sensed upstream and downstream pressures.

The differential pressure sensor 124 is coupled to the passageway 102 using two conduits, an upstream conduit 126 and a downstream conduit 128. In the preferred embodiment, the pressure sensor 122 is coupled to the passageway 102 using the upstream conduit 126, as well. It will be appreciated that the pressure sensor 122 could be coupled to the passageway 102 using a separate conduit. However, for space and component savings the pressure sensor 122 uses the upstream conduit 126. A flow venturi 130 is coupled to the downstream conduit 128 and is preferably positioned so that it is not within high fluid velocity streams when the valve 108 is near its closed position. As will be discussed in more detail below, the flow venturi 130 provides greater resolution of the differential pressure sensor signal at low fluid flow velocities. It will be appreciated that in an embodiment where the pressure sensor 122 is coupled to the passageway 102 downstream of the valve 108, the pressure sensor could share the downstream conpassageway 128 with the differential pressure sensor 124.

The controller 116 receives signals representative of upstream temperature, upstream pressure, valve position, and differential pressure across the valve 108 and, using these signals, determines the fluid flow rate through the passageway 102. In order to determine the fluid flow rate, the controller 116 first determines an uncorrected flow rate using the following flow equation:

$$W_{corr} = f(P_R, \Theta)$$

where $W_{corr}$ is corrected flow rate, $P_R$ is the pressure ratio ($P_{downstream}/P_{upstream}$), and $\Theta$ is valve position. More specifically, from the determined pressure ratio and valve position, $W_{corr}$ is determined from a predetermined map of corrected flow versus pressure ratio at various valve posi-tions. Once $W_{corr}$ is determined, actual mass flow rate is determined from the following equation:

$$W = W_{corr} \frac{\sqrt{\frac{P_{upstream}}{P_{STD}}}}{\frac{T_{upstream}}{T_{STD}}}$$

where $P_{upstream}$ is the upstream pressure, $T_{upstream}$ is the upstream temperature, $P_{STD}$ is standard pressure (14.7 psig), and $T_{STD}$ is standard temperature (59° F.). The pressure ratio ($P_R$) is determined from the differential pressure sensed by the differential pressure sensor 124 and the upstream pressure sensed by the pressure sensor 122, valve position is determined from the valve position sensor 118, and the $P_{upstream}$ and $T_{upstream}$ variables are sensed using the pressure sensor 122 and temperature sensor 120, respectively. Based on the determined actual flow rate, the controller 116 then supplies position control signals, as necessary, to the actuator assembly 114 so that the fluid flow rate through the passageway 102 is substantially equal to the commanded flow rate. As was noted above, downstream pressure and/or downstream temperature could be used as well.

Because the flow venturi 130 is positioned downstream of the valve 108, as the valve 108 moves toward its fill-open position, an increasing amount of fluid flows through the flow venturi 130. Thus, the flow venturi 130 effectively boosts the downstream pressure sensed by the differential pressure sensor 124 as the valve 108 moves toward its full-open position. As was alluded to above, this effect provides greater resolution of the differential pressure sensor signal at low fluid flow velocities.

Figure 3:
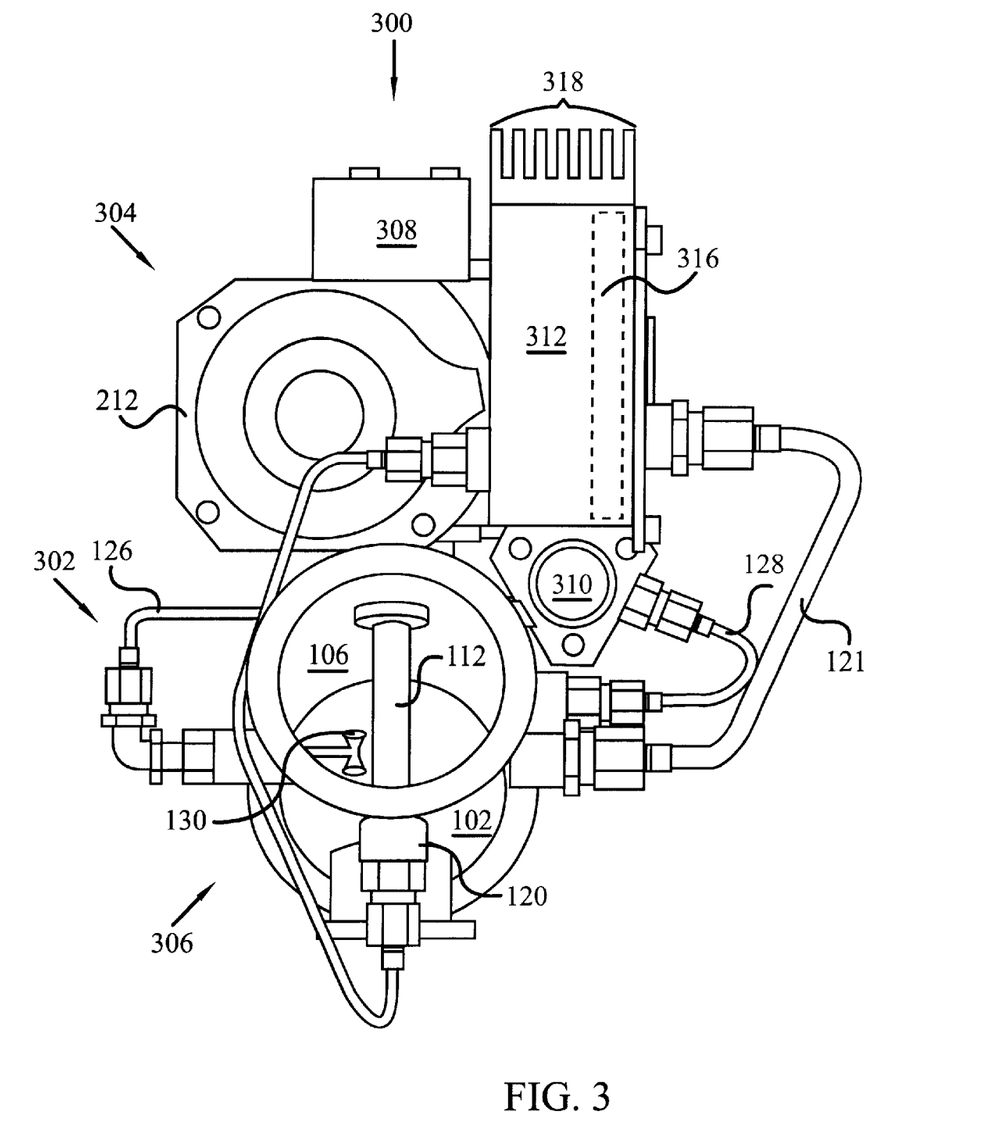
FIGS. 3–5 are back end, front end, and side views, respectively, of an exemplary fluid flow control valve according to an embodiment of the present invention.
Figure 4:
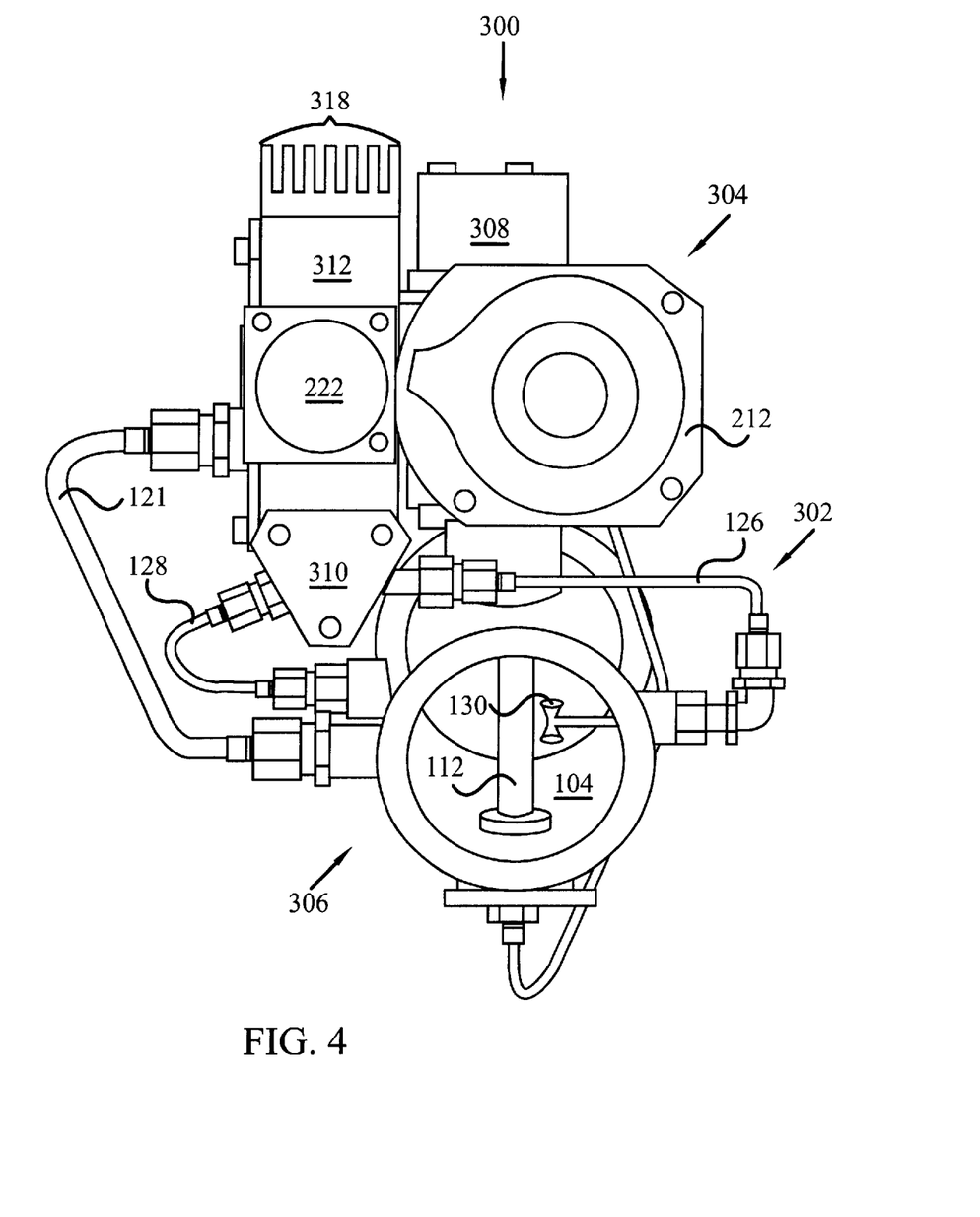
Figure 5:
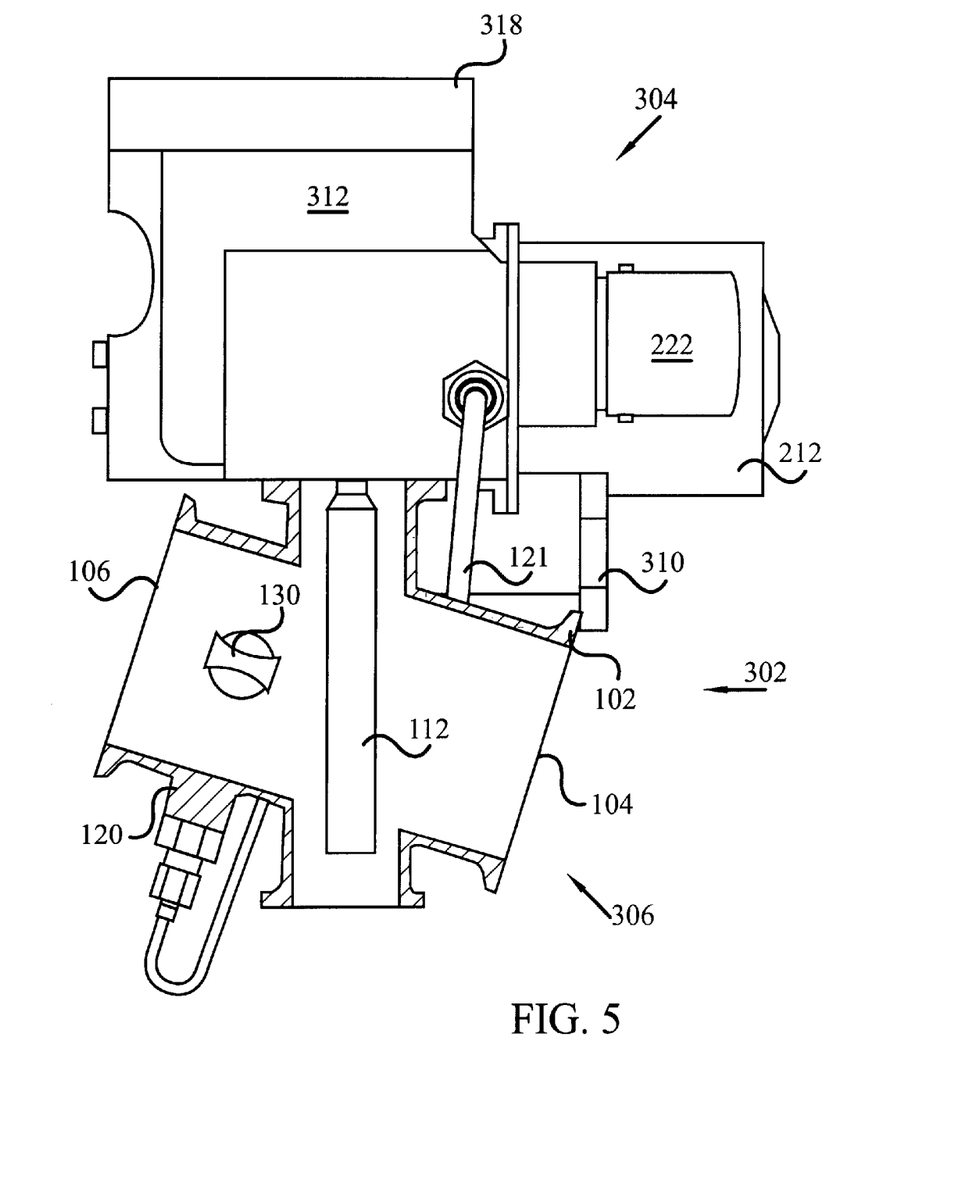

With the arrangement described above, fluid flow through the passageway 102 can be determined quickly and accurately and all of the above-described components can be configure into a single, relatively compact control valve assembly. In other words, the sensors can be located relatively close to the valve 108 itself, and the controller 116 need not be located remotely from the valve 108. An exemplary embodiment of one such control valve assembly is shown in FIGS. 3, 4, and 5, which depict back end, front end, and side views, respectively, of the control valve assembly.

The control valve assembly 300 includes a valve assembly 302 and a housing assembly 304. The valve assembly 302 includes a valve body 306 that forms the flow passageway 102 depicted schematically in FIG. 1, and thus includes the inlet end 104 and the outlet end 106. Moreover, though not illustrated in FIGS. 3–5, the valve 108, including the valve disk 110 and shaft 112, is mounted within the valve body 306. The housing assembly 304 is coupled to the valve assembly 302, and houses various ones of the components depicted in FIG. 1 and described above. In particular, the housing assembly 304 houses the actuator assembly 114, the controller 116, the valve position sensor 118, the pressure sensor 122, and the differential pressure sensor 124. The temperature sensor 120, which in this embodiment senses temperature downstream of the valve disk 110, is not housed within the housing assembly 304, since it is coupled directly to the flow passageway 102 upstream of the valve 108.

The housing assembly 304 may be constructed as a single, integral unit or may be constructed of various interconnected housings. In a preferred embodiment, the housing assembly 304 is constructed of various interconnected housings. This type of construction eases assembly, maintenance, reuse, and repair of the control valve assembly 300. Thus, the housing assembly 304 preferably includes the actuator housing 212, the torque motor housing 222, a position sensor housing 308, a pressure sensor housing 310, and a controller housing 312. In a preferred embodiment, the actuator housing 212 houses the dual-faced piston 208 and spring 210, and includes the first supply pressure port 216, the first ambient pressure port 218, and the first control pressure port 220, all of which were previously described above. Similarly, as was previously described, the torque motor housing 222 houses the electrical coils 224 and the pivotally mounted control shaft 226, and includes the second supply pressure port 228, the second ambient pressure port 230, and the second control pressure port 232.

The position sensor housing 308 houses the valve position sensor 118 which, as was noted above, senses valve position and supplies a representative position signal to the controller 116. The pressure sensor housing 310 houses both the pressure sensor 122 and the differential pressure sensor 124. The controller housing 312 houses, among other things, the electrical components that comprise the controller 116. In particular, the controller housing 312 houses one or more circuit boards that have mounted thereon the electrical and electronic components that make up the controller 116. Although the controller 116 may be constructed of a plurality of individual circuit boards, in a preferred embodiment the controller 116 is constructed of a single, double-sided circuit board 314. The controller housing 312 also houses a thermoelectric (Peltier) cooler 316 that, as is generally known, to absorb heat from the circuit board 314 and reject it to the surrounding environment. As FIGS. 3 and 5 depict, the controller housing 312 also preferably includes a plurality of fins 318 to assist rejecting the heat from the controller housing 312.

The present invention provides a flow control valve, and a method of determining and controlling fluid flow through the valve, that is relatively simple in design, is relatively inexpensive, is accurate, and is not limited in its measurement range. It also provides a flow control valve that is relatively compact and includes all of the flow measurement and control components in a single, relatively compact assembly.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A valve for measuring and controlling a fluid flow parameter, comprising:
    a valve assembly having an inlet, an outlet, and a passageway therebetween;
    a variable area flow orifice mounted in the passageway;
    a differential pressure sensor operable to sense a differential pressure across the variable area flow orifice and supply a differential pressure signal;
    an upstream conduit having an inlet coupled to the passageway upstream of the variable area flow orifice and an outlet coupled to the differential pressure sensor;
    a downstream conduit having an inlet coupled to the passageway downstream of the variable area flow orifice and an outlet coupled to the differential pressure sensor;
    a flow venturi coupled to the downstream conduit inlet and positioned proximate the variable area flow orifice;
    a pressure sensor coupled to the passageway, the pressure sensor operable to sense fluid pressure within the passageway and supply a fluid pressure signal;
    a temperature sensor coupled to the passageway and operable to sense fluid temperature and supply a fluid temperature signal;
    a position sensor operable to sense a position of the variable area flow orifice and supply a position signal; and
    a processor coupled to receive the differential pressure signal, the fluid pressure signal, the fluid temperature signal, and the position signal and operable to determine the fluid flow parameter in the passageway therefrom.

2. The valve of claim 1, wherein the processor generates an orifice position control signal based on the determined fluid flow parameter, and wherein the valve further comprises:
    an actuator assembly coupled to receive the orifice position control signal from the processor and operable, in response thereto, to vary an area of the variable area flow orifice, whereby fluid flow parameter through the passageway is controlled.

3. The valve of claim 1, wherein:
    the variable area flow orifice is a butterfly valve that is rotationally mounted in the passageway via a shaft; and
    the flow venturi is positioned proximate the shaft.

4. The valve of claim 1, wherein the pressure sensor is a static pressure sensor.

5. The valve of claim 1, wherein the pressure sensor is a total pressure sensor.

6. The valve of claim 2, wherein the actuator assembly comprises:
    a torque motor coupled to receive the orifice position control signals from the processor and operable, in response thereto, to vary a control pressure magnitude in a control pressure line;
    an actuator housing having at least a control pressure port coupled to the control pressure line; and
    a piston assembly slidably mounted within the actuator housing, the piston assembly having a first end in fluid communication with the control pressure port and a second end coupled to the variable area flow orifice,
    wherein variation in the control pressure magnitude causes translation of the piston assembly and variation of the area of the variable area flow orifice.

7. The valve of claim 1, wherein the temperature sensor senses fluid temperature upstream of the variable area flow orifice.

8. The valve of claim 1, wherein the temperature sensor senses fluid temperature downstream of the variable area flow orifice.

9. The valve of claim 1, wherein the pressure sensor is coupled to the passageway upstream of the variable area flow orifice.

10. The valve of claim 1, wherein the pressure sensor is coupled to the passageway downstream of the variable area flow orifice.

11. A valve for measuring and controlling a fluid flow parameter, comprising:
    a valve assembly having an inlet, an outlet, and a passageway therebetween;
    a variable area flow orifice mounted in the passageway;

a differential pressure sensor operable to sense a differential pressure across the variable area flow orifice and supply a differential pressure signal;

an upstream conduit having an inlet coupled to the passageway upstream of the variable area flow orifice and an outlet coupled to the differential pressure sensor;

a downstream conduit having an inlet coupled to the passageway downstream of the variable area flow orifice and an outlet coupled to the differential pressure sensor;

a flow venturi coupled to the downstream conduit inlet and positioned proximate the variable area flow orifice;

a pressure sensor coupled to the passageway, the pressure sensor operable to sense fluid pressure within the passageway and supply a fluid pressure signal;

a temperature sensor coupled to the passageway and operable to sense fluid temperature and supply a fluid temperature signal;

a position sensor operable to sense a position of the variable area flow orifice and supply a position signal;

a processor coupled to receive the differential pressure signal, the upstream fluid pressure signal, the fluid temperature signal, and the position signal and operable to (i) determine the fluid flow rate in the passageway therefrom, and (ii) generate an orifice position control signal based on the determined fluid flow rate; and an actuator coupled to receive the orifice position control signal from the processor and operable, in response thereto, to vary an area of the variable area flow orifice, whereby fluid flow rate through the passageway is controlled.

12. A flow control valve for controlling the flow of a fluid in one or more parts of a system, the valve comprising:
a) a valve assembly including:
(i) a passageway having a flow passage extending between a fluid inlet and a fluid outlet, and
(ii) a valve disk rotationally mounted within the flow passage and moveable through a plurality of positions each corresponding to a different flow area;
b) a temperature sensor coupled to the passageway and operable to sense fluid temperature and supply a fluid temperature signal; and
c) a housing assembly coupled to the valve assembly, the housing assembly enclosing:
(i) a first pressure sensor in fluid communication with the passageway and operable to sense a first fluid pressure within the passageway and supply a first fluid pressure signal,
(ii) a second pressure sensor coupled to the duct, the second pressure sensor operable to sense fluid pressure within the passageway and supply a second fluid pressure signal,
(iii) a position sensor coupled to the valve element, the position sensor operable to sense a position of the valve element and supply a position signal, and
(iv) a processor coupled to receive the first fluid pressure signal, the second fluid pressure signal, the fluid temperature signal, and the position signal and operable to determine a fluid flow parameter through the passageway therefrom.

13. The valve of claim 12, wherein the processor generates a valve position control signal based on the determined fluid flow parameter, and wherein the housing further encloses:
an actuator assembly coupled to receive the orifice position control signal from the processor and operable, in response thereto, to move the valve disk, whereby fluid flow parameter through the passageway from the fluid inlet to the fluid outlet is controlled.

14. The valve of claim 12, further comprising:
a cooler positioned within the housing proximate the processor for removing heat therefrom.

15. The valve of claim 14, wherein the cooler comprises an active cooler.

16. The valve of claim 15, wherein the active cooler is a thermoelectric cooler.

17. The valve of claim 12, wherein the first pressure sensor is a differential pressure sensor, and the first fluid pressure signal is a differential pressure signal, and wherein the valve further comprises:
an upstream conduit having an inlet coupled to the passageway upstream of the valve element and an outlet coupled to the pressure sensor housing and in fluid communication with the differential pressure sensor;
a downstream conduit having an inlet coupled to the passageway downstream of the valve element and an outlet coupled to the pressure sensor housing and in fluid communication with the differential pressure sensor; and
a flow venturi coupled to the downstream conduit inlet.

18. The valve of claim 17, wherein the flow venturi is positioned within the passageway proximate the valve disk.

19. The valve of claim 17, wherein the second pressure sensor is a static pressure sensor.

20. The valve of claim 17, wherein the second pressure sensor is a total pressure sensor.

21. The valve of claim 13, wherein the actuator assembly comprises:
a torque motor coupled to receive the orifice position control signals from the processor and operable, in response thereto, to vary a control pressure magnitude in a control pressure line;
an actuator housing having at least a control pressure port coupled to the control pressure line; and
a piston assembly slidably mounted within the actuator housing, the piston assembly having a first end in fluid communication with the control pressure port and a second end coupled to the variable area flow orifice,
wherein variation in the control pressure magnitude causes translation of the piston assembly and variation of the area of the variable area flow orifice.

22. The valve of claim 12, wherein the temperature sensor senses fluid temperature upstream of the variable area flow orifice.

23. The valve of claim 12, wherein the temperature sensor senses fluid temperature downstream of the variable area flow orifice.

24. The valve of claim 17, wherein the second pressure sensor is coupled to the passageway upstream of the variable area flow orifice.

25. The valve of claim 17, wherein the second pressure sensor is coupled to the passageway downstream of the variable area flow orifice.

26. A valve for measuring and controlling a fluid flow parameter, comprising:
a valve assembly having an inlet, an outlet, and a passageway therebetween;
a variable area flow orifice mounted in the passageway;
a differential pressure sensor operable to sense a differential pressure across the variable area flow orifice and supply a differential pressure signal;

an upstream conduit having an inlet coupled to the passageway upstream of the variable area flow orifice and an outlet coupled to the differential pressure sensor;

a downstream conduit having an inlet coupled to the passageway downstream of the variable area flow orifice and an outlet coupled to the differential pressure sensor;

a flow venturi coupled to the downstream conduit inlet and positioned proximate the variable area flow orifice; and a processor coupled to receive the differential pressure signal and operable to determine the fluid flow parameter in the passageway therefrom.

27. A method of determining a fluid flow parameter in a passageway having a variable area flow orifice, comprising:

determining differential pressure across the variable area flow orifice;

determining fluid pressure upstream of the variable area flow orifice;

determining fluid temperature in the duct;

determining a position of the variable area flow orifice; and determining the fluid flow rate parameter in the passageway based on the measured differential pressure, the measured upstream fluid pressure, the measured fluid temperature, and the determined valve position.

28. The method of claim 27, wherein the step of determining the fluid flow parameter comprises:

determining a pressure ratio of downstream pressure to upstream pressure based on the determined differential pressure and the determined upstream pressure;

determining a corrected flow rate based on the determined pressure ratio and the determined valve position;

determining the fluid flow rate based on the corrected flow rate and the measured temperature and measured upstream pressure.

29. The method of claim 28, wherein the step of determining the fluid flow parameter, further comprises:

determining a ratio of the measured temperature to a standard temperature value to obtain a temperature correction value;

determining a ratio of the measured upstream pressure to a standard pressure value to obtain a pressure correction value;

determining a ratio of the temperature correction value to the pressure correction value to obtain a pressure-temperature correction value; and multiplying the uncorrected fluid flow rate by the pressure temperature correction value.

30. The method of claim 28, wherein the step of measuring the differential pressure across the variable area flow orifice comprises:

coupling an inlet of an upstream conduit to the passageway upstream of the variable area flow orifice and coupling an outlet of the upstream conduit to a differential pressure sensor;

coupling an inlet of a downstream conduit to the passageway downstream of the variable area flow orifice and coupling an outlet of the downstream conduit to the differential pressure sensor; and coupling a flow venturi to the inlet of the downstream conduit and positioning the flow venturi proximate the variable area flow orifice.

31. The method of claim 28, wherein the fluid temperature is sensed upstream of the variable area flow orifice.

32. The valve of claim 28, wherein the fluid temperature is sensed downstream of the variable area flow orifice.

* * * * *